United States Patent [19]

Dubin

[11] 4,217,214
[45] Aug. 12, 1980

[54] HIGH MOLECULAR WEIGHT POLYVINYLAMINE HYDROCHLORIDE AS FLOCCULANT

[75] Inventor: Paul L. Dubin, Menlo Park, Calif.

[73] Assignee: Dynapol, Palo Alto, Calif.

[21] Appl. No.: 949,932

[22] Filed: Oct. 10, 1978

[51] Int. Cl.² .......................... B01D 21/01; C02B 1/20
[52] U.S. Cl. .......................................... 210/52; 210/54
[58] Field of Search .................. 210/10, 42 R, 51–54; 260/583 P; 526/291

[56] References Cited

U.S. PATENT DOCUMENTS

| | | | |
|---|---|---|---|
| 3,472,767 | 10/1969 | Lees | 210/10 |
| 3,715,336 | 2/1973 | Nowak et al. | 210/54 |
| 3,953,330 | 4/1976 | Tonkyn et al. | 210/52 |
| 4,018,826 | 4/1977 | Gless, Jr. et al. | 526/12 |

FOREIGN PATENT DOCUMENTS 5199693  9/1976  Japan ......................................... 210/54

Primary Examiner—Charles N. Hart
Assistant Examiner—Peter A. Hruskoci
Attorney, Agent, or Firm—William H. Benz

[57] ABSTRACT

High molecular weight polyvinylamine hydrochloride for use as a flocculating agent in waste water systems is disclosed.

6 Claims, 2 Drawing Figures

DOSAGE CURVES FOR POLYVINYLAMINE HYDROCLORIDE AT MOLECULAR WEIGHTS OF $5 \times 10^4$ (○), GREATER THAN $2 \times 10^6$ (△), AND PRIMAFLOC C-7 (●). ORDINATE IS O.D. OF SUPERNATANT AFTER 15 MINUTES SETTLING TIME. ARROWS INDICATE POSITION OF OPTIMUM DOSE.

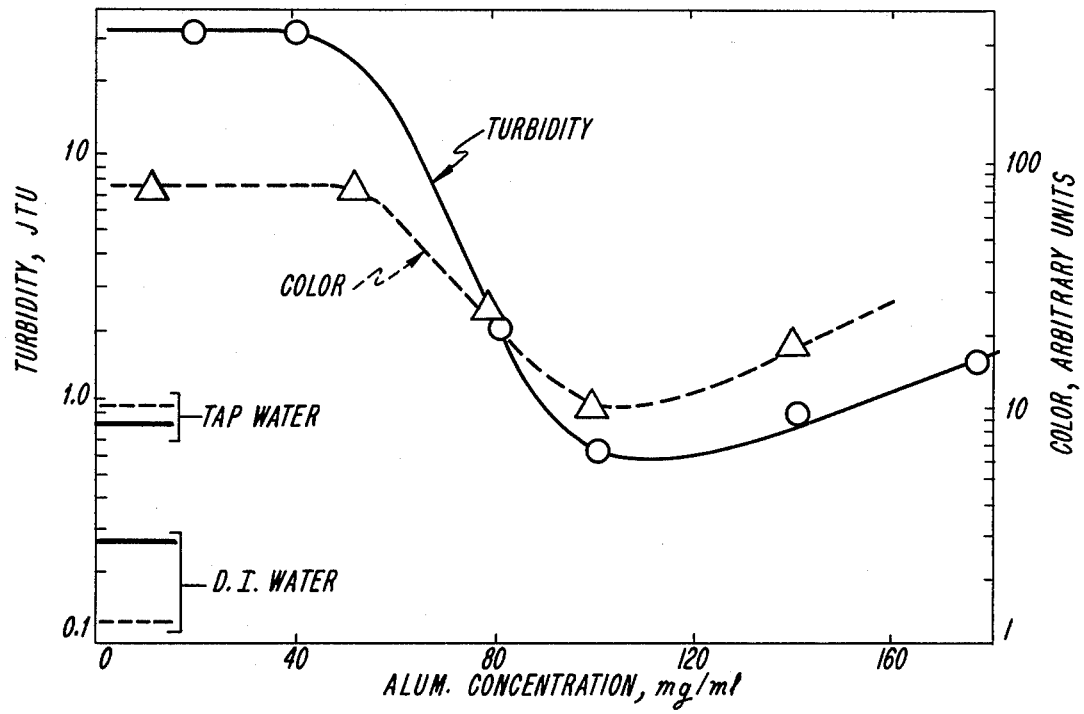
Fig. 1 DETERMINATION OF OPTIMUM ALUM. DOSE FOR SYNTHETIC RIVER WATER (○——) TURBIDITY (△---) COLOR
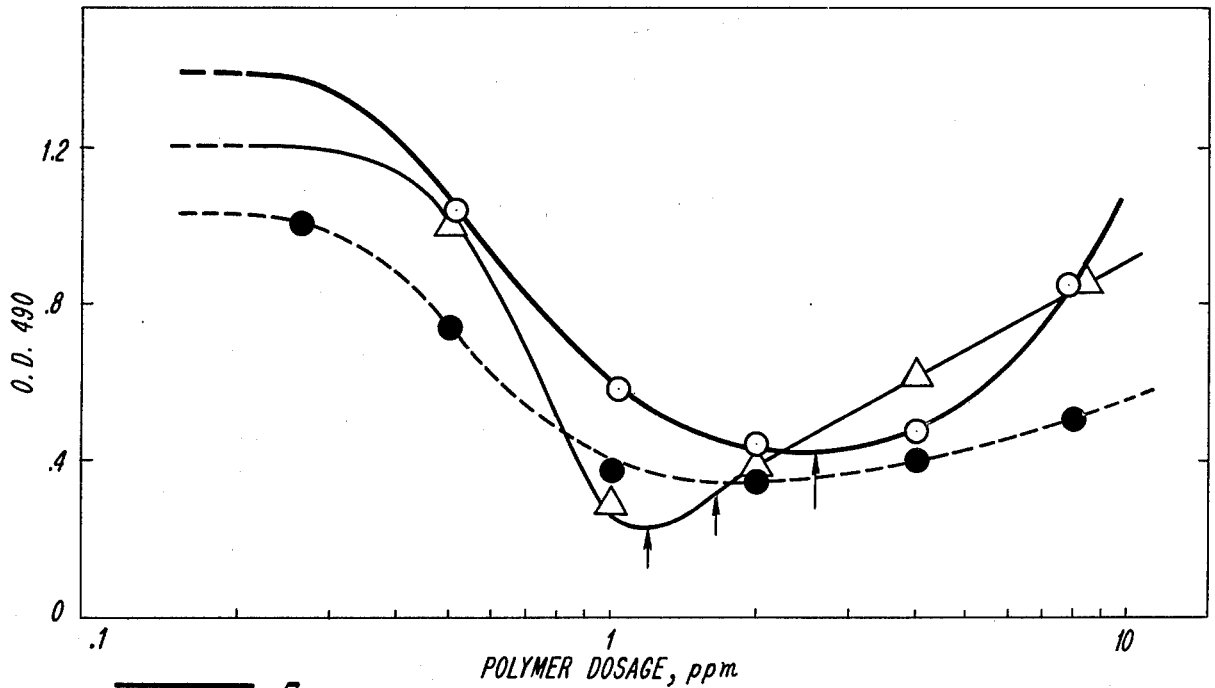
Fig. 2 DOSAGE CURVES FOR POLYVINYLAMINE HYDROCLORIDE AT MOLECULAR WEIGHTS OF $5 \times 10^4$ (○), GREATER THAN $2 \times 10^6$ (△), AND PRIMAFLOC C-7 (●) ORDINATE IS O.D. OF SUPERNATANT AFTER 15 MINUTES SETTLING TIME. ARROWS INDICATE POSITION OF OPTIMUM DOSE.

HIGH MOLECULAR WEIGHT POLYVINYLAMINE HYDROCHLORIDE AS FLOCCULANT

BACKGROUND OF THE INVENTION

1. Field of the Invention

The present invention relates to the use of high molecular weight polyvinylamines as flocculants and, more especially, relates to the use of the higher molecular weight polyvinylamine hydrochlorides for the flocculation of suspended solids in water purification or waste water clarification systems.

2. Description of the Prior Art

Stable colloids or suspensions arise in many civil and industrial processes and their treatment often poses a problem. Notable examples are the clarification of turbid water for human consumption and the control of pollution in municipal and industrial waste water. The treatment of such systems commonly utilizes flocculation, a process in which small particles are agglomerated and hence settle more rapidly and are more readily filtered, This procedure is critically used in such diverse fields as paper making and mining, although the dominant market for such flocculants is potable water purification and sewage pollution control.

Heretofore, alum and ferric chloride have been the principal commercial flocculants. More recently, attention has focused on the use of synthetic polymers in flocculation systems. The rapidly expanding role of synthetic polymers as flocculant aids is attributable to their ability to greatly reduce the requisite quantities of inorganic flocculants and to impart superior flocculation behavior such as faster settling rates and improved filterability. Other factors that militate against the use of inorganic flocculants alone in waste-water treatment are their corrosiveness and their conversion to noncombustible oxides during the sludge burning process.

Thus far a number of polymers have been commercialized for water treatment. These include polyacrylic acid, polyarylamide and its partial hydrolysis product, cationic starch, polyethylenimine and polystyrene sulfonates. See, e.g., J. K. Dixon, "Flocculation", In Encyclopedia of Polymer Science and Technology, V. 1, N. M. Bikales, Ed., Wiley-Intersciences, N.Y. 1967.

Although the use of polyvinylamine and copolymers of vinylamine and vinyl alcohol as flocculants has been suggested (see, e.g., Terres Eaux, 1968, 21 (55) 27–8 and U.S. Pat. No. 3,715,336) there is substantial authority for the proposition that polyvinylamine actually exhibits deflocculation characteristics. (See, e.g., Chemical Abstracts, 49, 12801h (1955)). It is, therefore, evident that thus far the prior art has failed to appreciate the significance of polyvinylamine as a flocculating agent, and, in truth, has discouraged the use of polyvinylamine in this regard by ambiguous teachings.

SUMMARY OF THE INVENTION

Accordingly, it is a primary object of the present invention to provide for the use of polyvinylamine hydrochloride as an effective flocculating agent having utility in a variety of water treatment systems.

Another object of the present invention is to provide a high molecular weight polyvinylamine hydrochloride which exhibits unexpectedly superior flocculation characteristics over its low molecular weight counterpart as well as other known flocculating agents.

Other objects and advantages of the present invention will be evident to those of skill in the art upon studying the detailed description which follows:

BRIEF DESCRIPTION OF THE DRAWINGS

FIG. 1 depicts the determination of optimum alum dose levels for synthetic river water.

FIG. 2 illustrates dosage curves for polyvinylamine hydrochloride at various molecular weights.

DETAILED DESCRIPTION OF THE INVENTION

The aforementioned objects of the invention are accomplished by the discovery that high molecular polyvinylamine hydrochloride is effective as a flocculant and readily adapted for use in conventional water treatment systems, including water clarification and sludge treatment. More particularly, it has been discovered that such polyvinylamine hydrochloride having a molecular weight greater than $3 \times 10^5$ and preferably greater than or equal to $5 \times 10^5$, exhibit such characteristics.

The polyvinylamine hydrochloride employed in the present invention are prepared as described in U.S. Pat. No. 4,018,826, the disclosure of which is hereby incorporated by reference. As therein disclosed, polyvinylamine salts of mineral acids, such as polyvinylamine hydrochloride, are prepared by reacting acetaldehyde and acetamide with acid catalyst, followed by cracking the resulting ethylidene-bis-acetamide into vinylacetamide which is sequentially polymerized, hydrolyzed and converted to the desired amine salts by contacting with an appropriate mineral acid. The molecular weight of the product polyvinylamine hydrochloride is dependent upon the molecular weight of the polyvinylamide precursor which, being formed via a free radical polymerization, may be controlled by methods known to those of skill in the art.

Polyvinylamine hydrochloride having a molecular weight of approximately $5 \times 10^5$ or greater has been found to be particularly effective as a flocculating agent. Comparisons of its effectiveness with that of other known polymeric flocculants is set forth in the Examples which follow the description of the invention.

The amount of polyvinylamine hydrochloride flocculant required to effectively reduce turbidity and discoloration due to entrained solids in water treatment systems is dependent upon numerous factors of which the nature of the material to be agglomerated is one of the most critical. Thus, the effective dosage levels of polyvinylamine hydrochloride is directly dependent upon the composition of the water being treated. Generally, dosage levels up to 10 mg/l, and preferably 4 mg/l of polyvinylamine hydrochloride are effective in removing most sources of turbidity and a discoloration from water.

Because of economic considerations, polymeric flocculants are often employed as "secondary flocculants" in conjunction with inexpensive primary flocculants such as alum and $FeCl_3$. Water treatment systems are usually optimized on the basis of both the primary flocculant and the polymer to achieve the most effective treatment at the lowest cost. Of course, when used in conjunction with inorganic flocculants, less polymer is required than in systems relying on the polymer alone. Thus, when used in combination with inorganic flocculants, the quantity of polyvinylamine hydrochloride required is usually not in excess of about 5 mg/l.

In sewage sludge treatment systems, substantially greater quantities of polyvinylamine hydrochloride are required to effectively improve the filtration rate of the sludge. Typical polymer dosage levels are 5 lbs/ton of dry solids for primary sludge and 5 to 20 lbs/ton for waste activated sludge. Primary sludge is the precipitate formed from the settling of raw sewage with a typical concentration of 5% total solids. Waste activated sludge is the precipitated product resulting from treating the suspended matter remaining after primary treatment to either aerobic or anaerobic bacterial consumption of the dissolved and suspended organic materials. It consists primarily of bacterial polysaccharides, glycoproteins and nucleic acids and has a lower total solids content than primary sludge. Waste activated sludge is commonly treated by vacuum filtration and incineration. Polymeric flocculants are useful in improving filterability and providing greater concentrations of total solids in the filter cake.

The discovery of the effectiveness of high molecular weight polyvinylamine hydrochloride as flocculants is thus adaptable for use in a variety of water treatment systems. The determination of optimum dosage levels, being dependent upon the particular system employed, can be easily determined by one of ordinary skill in the art by balancing the aforementioned economic and clarification considerations.

To further illustrate the various objects and advantages of the present invention, the following examples are provided, it being understood that their purpose is entirely illustrative and are in no way intended to limit the scope of the invention.

Example 1

Flocculation of Silica Suspensions

To examine the ability of high molecular weight polyvinylamine hydrochloride to flocculate silica, a 2% w/w suspension of silica was transferred to a graduated cylinder. Polyvinylamine hydrochloride having a molecular weight of $2 \times 10^6$ was added at a dosage level of 4 mg/l and the cylinder was inverted several times. Complete flocculation of the silica was obtained in 120 seconds.

Comparison tests with Primafloc ®C-7 (polyvinylimidazoline sulfate manufactured by Rohm & Haas Co.) were then conducted at varying dose levels. The qualitative results of these tests are summarized in Table I.

TABLE I

FLOCCULATION OF COLLOIDAL SILICA[a] - COMPARISON OF POLYVINYLAMINE HYDROCHLORIDE[b] WITH PRIMAFLOC ® C-7.

| Dose Level | Observations | |
|---|---|---|
| mg/l | Settling Rate | Supernatant Clarity |
| 1 | Roughly equal volumes of floc after 600 sec. | Both turbid. |
| 2 | Floc volume 1½ × greater with PAE. | Clearer supernatant for PAE. |
| 4 | Slightly greater settling rate for PAE. | Clearer supernatant for PAE. |
| 6 | More rapid settling for PAE. | Clearer supernatant for PAE. |
| 9 | More rapid settling for PAE. PAE floc more compact. | Clearer supernatant for PAE. |

[a] Syloid 74, Grace Chemical Co., 10% w/w.
[b] Molecular weight 1–2 × $10^6$.

A more detailed comparison, utilizing the same components and procedure result in the data summarized in Table II.

TABLE II

COMPARISON TESTS OF SILICA FLOCCULATION

| Dose level (mg/l) | POLYVINYLAMINE HYDROCHLORIDE | | PRIMAFLOC ® C-7 | |
|---|---|---|---|---|
| | Settling Time, sec.[a] | Supernatant Clarity | Settling Time, sec. | Supernatant Clarity |
| 0 | 10,000 | — | 10,000 | — |
| 2 | 200 | Turbid | 250 | Turbid |
| 4 | 310 | Very clear | 500 | Sl. Turbid |
| 6 | 380 | Very slightly turbid | 700 | Very sl. turbid |
| 10 | 390 | Very slightly turbid | 1,000 | Very sl. turbid |

[a] Time to form a 3 ml floc (from a 10 ml suspension).

In terms of supernatant clarity and settling rate, the optimum dose for the polyvinylamine was about 4 mg/l.

Example 2

Water Clarification

To examine the effect of polyvinylamine as a "secondary flocculant" used in conjunction with alum to clarify water, the following tests were conducted. Firstly, the effectiveness of alum alone in clarifying synthetic river water (a solution of 100 mg kaolin clay, 100 mg $CaCO_3$, 1 liter distilled water, and instant coffee having a pH of 7) was determined and is pictured graphically in FIG. 1. Secondly, on the basis of these results, tests were conducted at 40 and 60 gm/l of alum in synthetic river water to determine if the addition of polyvinylamine reduced the required alum dose for clarification. The results of these tests are summarized in Table III.

TABLE III

EFFECTIVENESS OF POLYVINYLAMINE HYDROCHLORIDE[a] AS A FLOCCULANT AID WITH ALUM IN SYNTHETIC RIVER WATER

| Alum, mg/l | Polyvinylamine Hydrochloride mg/l | Turbidity, J.T.U. | Color |
|---|---|---|---|
| 40 | 0.1 | 29 | 75 |
| " | 1.0 | 30 | 75 |
| " | 5.0 | 1.8 | 25 |
| 60 | 0.1 | 33 | 75 |
| " | 1.0 | 1.3 | 20 |
| " | 5.0 | 1.4 | 20 |
| Tap water | | .85 | 10 |
| Deionized water | | .28 | 0 |

[a] Molecular weight of $5 \times 10^5$ or greater.

Comparision with FIG. 1 reveals that 5 ppm polyvinylamine hydrochloride doubles the effectiveness of alum at 40 mg/l, and that 1 ppm polyvinylamine hydrochloride yields a 30% increase in the effectiveness of alum at 60 mg/l. Thus, addition of 1 mg/l of the polymer permits a reduction at 20 mg/l in alum.

Lastly, comparisons were made between Primafloc ®C-7 and the high molecular polyvinylamine hydrochloride at alum concentrations of 40 and 60 mg/l. The results are summarized in Table IV.

TABLE IV
COMPARATIVE EFFECTIVENESS OF PRIMAFLOC® C-7 AND HIGH MOLECULAR WEIGHT POLYVINYLAMINE HYDROCHLORIDE[a] AS FLOCCULATION AIDS.

| Alum mg/l | Polymer, mg/l | Turbidity Primafloc® C-7 | Turbidity Polyvinyl-amine hydrochloride | Color Primafloc® | Color Polyvinyl-amine hydrochloride |
|---|---|---|---|---|---|
| 40 | 0.6 | 14 | 7.7 | 80 | 75 |
| 40 | 0.8 | 21 | 3.0 | 80 | 50 |
| 40 | 0.9 | 14 | 1.7 | 80 | 30 |
| 60 | .05 | 0.6 | 1.0 | 10 | 15 |
| 60 | 0.1 | 0.8 | 0.7 | 15 | 10 |
| 60 | 0.4 | 0.8 | — | 15 | — |

[a]Molecular weight of $5 \times 10^5$ or greater.

Additionally, supernatant clarity was better with the polyvinylamine than with Primafloc ®C-7 in every case except at an alum level of 60 mg/l and a polymer dose of 0.1 mg/l.

Example 3

Sewage Sludge Dewatering

Tests were conducted using both primary and waste activated sludge. Primafloc ®C-7 and high molecular weight polyvinylamine hydrochloride were added to waste water sludge containing 1% total solids and primary sludge containing 5.7% total solids at dosage levels ranging from 8 to 20 lbs/ton dry solids (40 to 100 mg/l.). The filtration rate of the sludge so treated was measured giving the results shown in Table V.

TABLE V.
DEWATERABILITY COMPARISON TESTS

| Sludge Type | Polymer concentration, Lbs. per ton of total solids | Filtration Rate,b(ml²/sec) Primafloc® C-7 | Filtration Rate,b(ml²/sec) Polyvinylamine Hydrochloride |
|---|---|---|---|
| 1.0% WAS | 0 | — | .19 |
| " | 8 | .20 | .52 |
| " | 12 | .53 | .48 |
| " | 20 | .94 | .88 |
| 5.7% primary | 0 | — | .15 |
| " | 7 | 1.5 | 2.2 |

From this Table it is evident that at the higher concentrations the two polymers behave similarly, but at the lower concentrations the high molecular weight polyvinylamine provides filtration rates greater by 50 to 100%. Most notably, at 8 lbs/ton total solids of waste activated sludge a three-fold increase in filtration rate was observed over control, while Primafloc ®C-7 had no effect.

From the foregoing description and examples, it is clear that high molecular weight polyvinylamine and particularly polyvinylamine hydrochloride having a molecular weight of $5 \times 10^5$, exhibits flocculating capabilities which make it a highly desirable ingredient in water treatment systems.

Example 4

Dependence of Polyvinylamine Hydrochloride Flocculation Effectiveness on Molecular Weight To demonstrate the influence of molecular weight on flocculation efficacy of polyvinylamine hydrochloride, the following tests were performed. In all tests the polyvinylamine hydrochloride samples were prepared by hydrolysis of narrow-distribution molecular weight fractions of polyvinylacetamide.

Solutions of polyvinylamine hydrochloride at 1000 ppm were added to 1% w/w silica suspensions at varying dosage levels. After fifteen minutes of settling time, the turbidity of the supernatant was determined by measuring its optical density at 400 nm, using standard procedures. Plots of polymer dosage versus supernatant turbidity gave curves as pictured in FIG. 2, the increase in turbidity at higher polymer concentration corresponding to colloidal re-stabilization.

FIG. 2 presents dosage curves for polyvinylamine hydrochloride at molecular weights of $5 \times 10^4$[O], greater than $2 \times 10^6$ [Δ], and Primafloc C-7 [●]. Ordinate is OD of supernatant after 15 minutes settling time. Arrows indicate position of optimum dose.

The best flocculant displays the lowest optimal dose and the lowest supernatant turbidity. These values are provided in Table VI for the various solutions tested.

Reference to this table demonstrates that while little effect is evident at molecular weights below $3 \times 10^5$, the optimal dose improves by over a factor of two as the molecular weight exceeds approximately $5 \times 10^5$. Supernatant clarity improves in a more continuous manner. The highest molecular weight sample is clearly more effective than both Primafloc and the polyvinylamine hydrochloride fractions of lower molecular weight.

TABLE VI
FLOCCULANT EFFICACY OF POLYVINYLAMINE HYDROCHLORIDE AS A FUNCTION OF MOLECULAR WEIGHT

| MW of Fraction[a] | Optimal dose, ppm | Supernatant turbidity % of control |
|---|---|---|
| $5 \times 10^4$ | 2.5 | 30 |
| $1.3 \times 10^5$ | 2.7 | 26 |
| $3 \times 10^5$ | 2.7 | 26 |
| $1-2 \times 10^6$ | 1.4 | 27 |
| $2 \times 10^6$ | 1.2 | 22 |
| Primefloc C-7 ® | 1.7 | 33 |

While the invention has now been described in terms of certain preferred embodiments, and exemplified with respect thereto, the skilled artisan will appreciate that various substitutions, changes, omissions and modifications may be made without departing from the spirit thereof. Accordingly, it is intended that the invention be limited solely by the scope of the following claims.

What is claimed is:

1. In a method for treating suspensions of particulate solids in water to reduce the amount of solids contained therein, the improvement comprising admixing a sufficient amount of polyvinylamine hydrochloride of molecular weight at greater than $3 \times 10^5$ with the suspension to serve as a flocculating agent for the solids, and thereafter separating the flocculated particulate solids from said water.

2. The method as defined by claim 1 wherein said molecular weight is at least about $5 \times 10^5$.

3. The method as defined by claim 2, wherein the suspension of particulate solids in water is waste water and the amount of polyvinylamine added is sufficient to provide a concentration up to about 10 mg/l in the aqueous suspension.

4. The method as defined by claim 1, wherein said suspension of particulate solids in water is sewage sludge and the amount of polyvinylamine added is sufficient to provide a concentration of up to 20 lbs per ton of dry solids in the aqueous suspension.

5. The method as defined by claim 1 wherein a quantity of an inorganic flocculant is added in conjunction with said polyvinylamine.

6. The method as defined by claim 5, wherein said inorganic flocculant is selected from the group consisting of alum and $FeCl_3$.

* * * * *